(12) United States Patent
De Fort-Menares et al.

(10) Patent No.: US 8,176,175 B2
(45) Date of Patent: *May 8, 2012

(54) NETWORK RESPONSE TIME MEASUREMENTS IN AN ASYMMETRIC ROUTING ENVIRONMENT

(75) Inventors: Ulrica De Fort-Menares, San Carlos, CA (US); Benoit Claise, Crisnée (BE)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/184,754

(22) Filed: Jul. 18, 2011

(65) Prior Publication Data

US 2011/0270983 A1  Nov. 3, 2011

Related U.S. Application Data

(63) Continuation of application No. 11/717,932, filed on Mar. 14, 2007, now Pat. No. 7,984,140.

(51) Int. Cl.
*G06F 15/173* (2006.01)

(52) U.S. Cl. ....................................................... 709/224

(58) Field of Classification Search .................... 709/224
See application file for complete search history.

(56) References Cited

U.S. PATENT DOCUMENTS

| | | | |
|---|---|---|---|
| 5,937,169 A | 8/1999 | Connery et al. | |
| 6,650,640 B1 | 11/2003 | Muller et al. | |
| 6,665,725 B1 | 12/2003 | Dietz et al. | |
| 6,771,646 B1 | 8/2004 | Sarkissian et al. | |
| 7,124,173 B2 | 10/2006 | Moriarty | |
| 7,984,140 B2 * | 7/2011 | De Fort-Menares et al. | 709/224 |
| 2002/0016843 A1 | 2/2002 | Schweitzer et al. | |
| 2002/0129161 A1 | 9/2002 | Lloyd et al. | |
| 2002/0144156 A1 | 10/2002 | Copeland, III | |
| 2003/0126260 A1 | 7/2003 | Husain et al. | |
| 2004/0049576 A1 | 3/2004 | Schweitzer et al. | |
| 2005/0063302 A1 | 3/2005 | Samuels et al. | |
| 2005/0117513 A1 | 6/2005 | Park et al. | |
| 2006/0056429 A1 | 3/2006 | Usukura | |

* cited by examiner

*Primary Examiner* — Larry Donaghue
(74) *Attorney, Agent, or Firm* — Fish & Richardson P.C.

(57) ABSTRACT

In one embodiment, a method can include: (i) receiving flow records from a plurality of network devices on asymmetric paths; (ii) reconstructing a network transaction from the received flow records; and (iii) deriving response times using the reconstructed network transaction.

20 Claims, 5 Drawing Sheets

NETWORK RESPONSE TIME MEASUREMENTS IN AN ASYMMETRIC ROUTING ENVIRONMENT

CROSS REFERENCE TO RELATED APPLICATIONS

The present application is a continuation application of and claims priority to U.S. application Ser. No. 11/717,932, filed on Mar. 14, 2007, the entire contents of which are hereby incorporated by reference.

TECHNICAL FIELD

The present disclosure relates generally to network response time measurements in an asymmetric routing environment.

BACKGROUND

Packet traversal or response time may be a primary indicator of network or application service quality. Further, this metric can represent performance directly relevant to user experience or overall network behavior. Conventionally, many probe and/or network equipment vendors offer solutions to measure response times. Thus, networked devices that may already see every packet in a network can relatively easily calculate the traffic time spent traveling between a client and a server. Typically, this approach notes response times as traffic passes from the client to the server, and from the server to the client.

Such conventional passive type approaches provide measurements based on real traffic, which can accurately describe an end-user experience for some network arrangements. However, these approaches may not provide accurate response time measurements for other network arrangements, such as those including asymmetric routing environments.

DESCRIPTION OF EXAMPLE EMBODIMENTS

Overview

In one embodiment, a method can include: (i) receiving flow records from a plurality of network devices on asymmetric paths; (ii) reconstructing a network transaction from the received flow records; and (iii) deriving response times using the reconstructed network transaction.

In one embodiment, a system can include: (i) a collection engine for receiving flow records from a plurality of network devices, where the network devices can communicate data packets; (ii) logic configured to correlate at least two flow records received from different network devices on asymmetric links so as to generate a reconstructed network transaction; and (iii) logic configured to generate a response time measurement for at least a portion of the data packets based on the reconstructed network transaction.

In one embodiment, an apparatus can include: (i) one or more processors; and (ii) software encoded in one or more computer-readable media for execution by the one or more processors, and when executed operable to: (a) receive flow records from a plurality of network devices on asymmetric paths; (b) reconstruct a network transaction from the received flow records; and (c) derive response times using the reconstructed network transaction.

Example Embodiments

Figure 1:
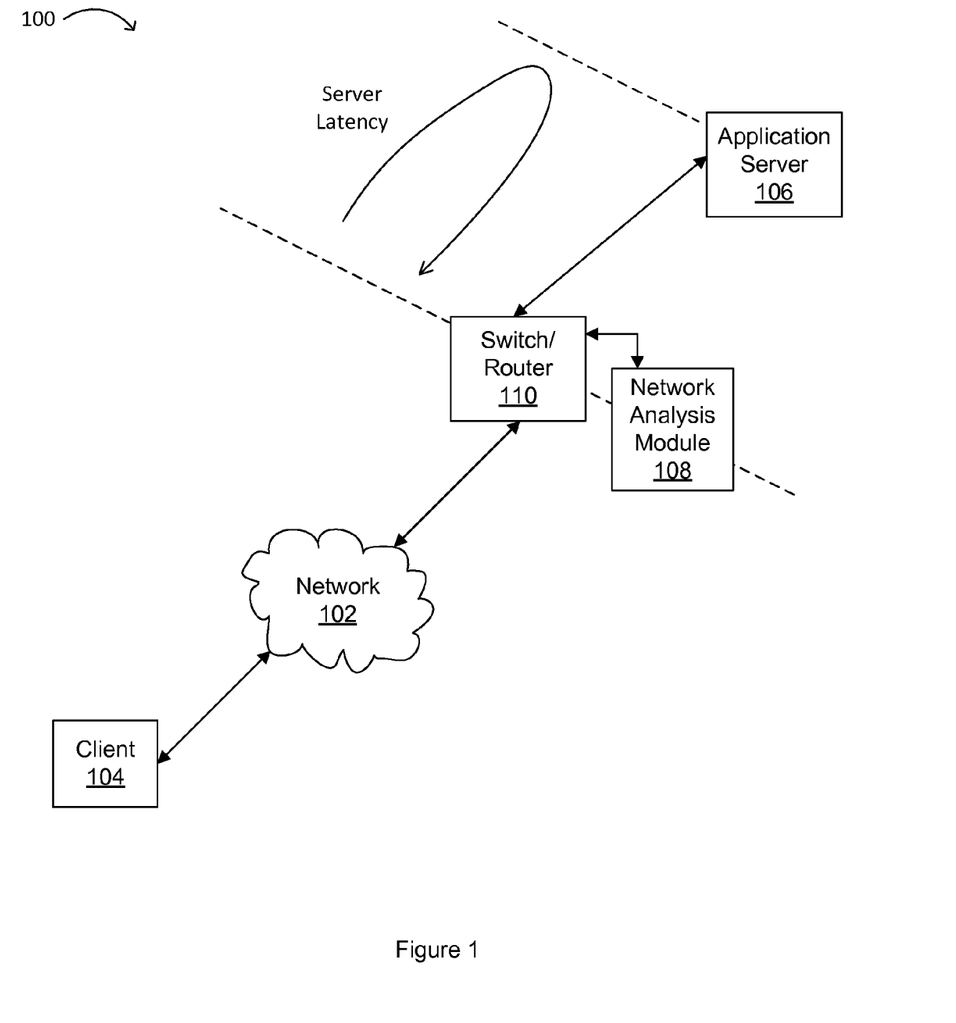
FIG. 1 illustrates an example network analysis module (NAM) response time measurement implementation.

Referring now to FIG. 1, an example network analysis module (NAM) response time measurement implementation is shown and indicated by the general reference character 100. One example of such a module is the Cisco Catalyst 6500 Series NAM, available from Cisco Systems. However, other types of NAMs, or modules having similar functionality, can be utilized. NAM 108 can be deployed relatively close to application server 106, and may be in or associated with, switch/router 110. For example, NAM 108 can be a blade included within switch/router 110.

Client 104 can be coupled to network 102, to which switch/router 110 can also be coupled. NAM 108 can observe actual user traffic between client 104 and application server 106. NAM 108 may monitor bidirectional traffic to be able to calculate response times or server latencies for transmission control protocol (TCP) traffic based on an IP address, port number, sequence numbers, and acknowledgments, for example.

Figure 2:
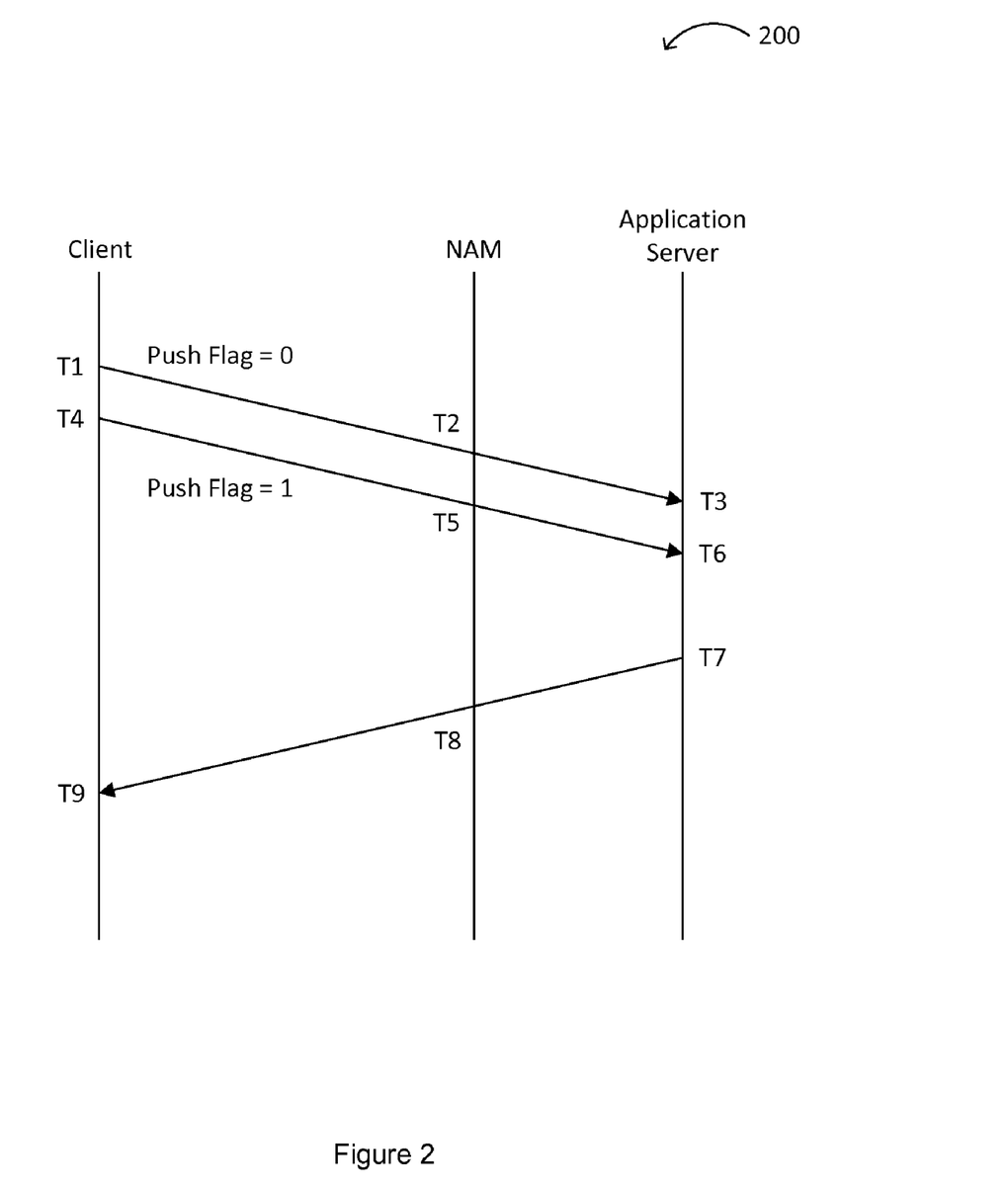
FIG. 2 illustrates an example transmission control protocol (TCP) transaction over time.

Referring now to FIG. 2, an example TCP transaction over time is shown and indicated by the general reference character 200. Arrows can represent packets traveling between the client (e.g., client 104 of FIG. 1) and the application server (e.g., application server 106 of FIG. 1). In FIG. 2, time increases while moving down the diagram. For example, T1 can represent a time of a first event, and T2 and can represent a subsequent event.

The client can initiate a request at T1, arriving at the NAM (e.g., NAM 108 of FIG. 1), and the application server at T2 and T3, respectively. This request does not have the push flag (e.g., PSH) set, which can indicate that there is more data to follow. At T4, a next packet may be sent from the client to the application server, and the packet can arrive at the NAM and the application server at T5 and T6, respectively. This packet can have the push flag set to "1" to indicate that it is the last packet. At T7, the application server can respond to the request, arriving at the NAM at T8, for example.

The approximation of a server delay can be T8-T5, while a real server delay may be T7-T6. However, since the probe (e.g., NAM) may be placed relatively close to the application server, this approximation may be accurate enough for many arrangements. However, conventional approaches of determining such response times may not be accurate in environments having asymmetric routing paths. This is because the probe may conventionally be positioned in the network such that the probe sees all traffic passing in both directions, but this positioning may not necessarily be feasible in asymmetric routing networks.

In order for increased response time measurement accuracy, a probe may need to see a request and the associated response from the client. As shown above in FIG. 2, some packets (e.g., request) may flow in one direction, while some packets (e.g., reply) may flow in the opposite direction, such that an asymmetric routing path may not see both such packet directions.

Figure 3:
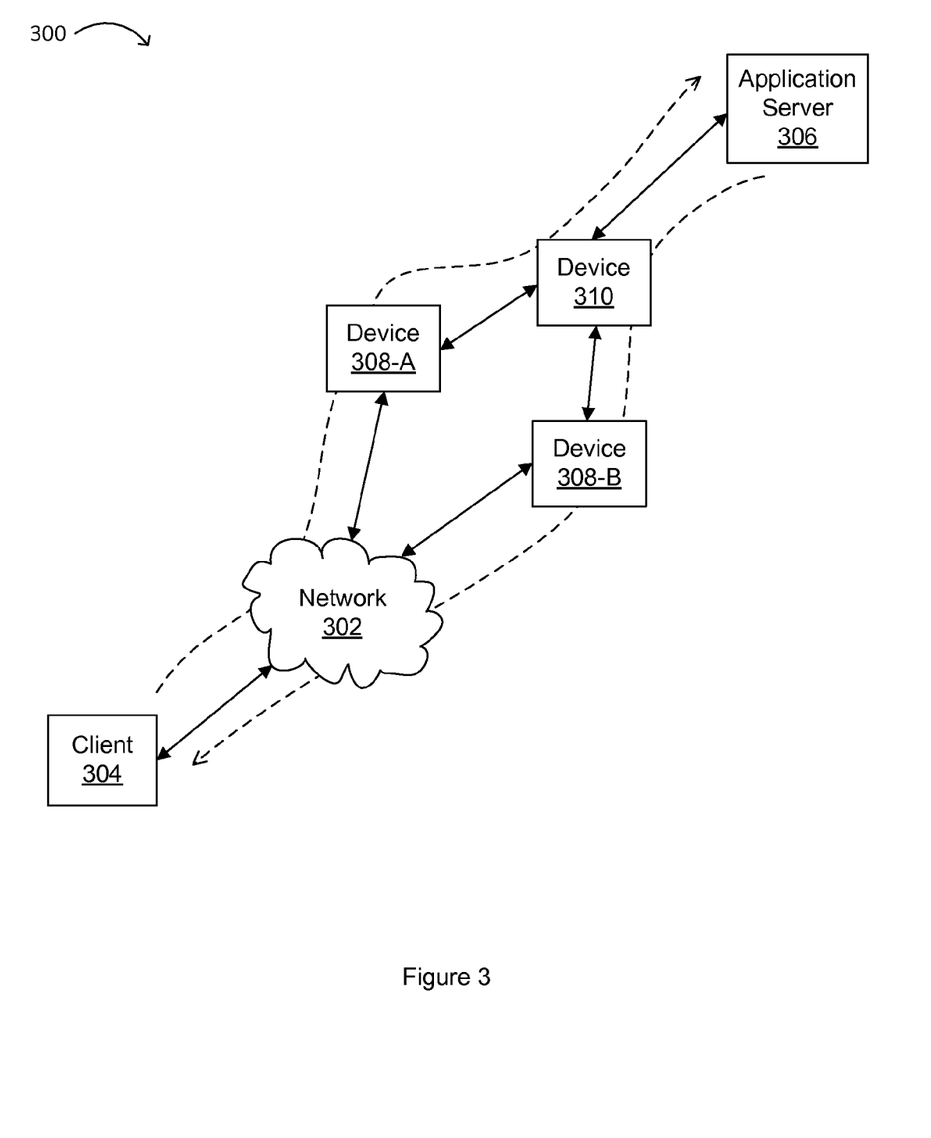
FIG. 3 illustrates an example asymmetric routing network arrangement.

Referring now to FIG. 3, an example asymmetric routing network arrangement is shown and indicated by the general reference character 300. A request from client 304 to application server 306 may traverse device 308-A via network 302. In addition, a response from application server 306 to client 304 may traverse device 308-B and network 302. An NAM attached to, or included within, a network device (e.g., device 308-A or 308-B) may see a request from client 304 to application server 306, but the NAM may not see a response to that request in order to appropriately measure the server delay time. Such asymmetric routing is common in a point-of-presence (POP), where redundant routers may be installed. Further, devices 308-A and 308-B can include, or be associated with an NAM, while device 310 may simply be a router, for example.

Accordingly, using a single probe to measure response times may not be suitable for an asymmetrical routing environment. In particular embodiments, a mechanism for conveying a relevant source of response time information from multiple network devices, and a technique to correlate the information in order to calculate the response times, can be implemented. The mechanism can use flow records (e.g., NetFlow records), or another suitable technology, as a source of the response time measurement data. Further, a technique in particular embodiments can define correlation logic using NetFlow records metered with Flexible NetFlow (FNF) in order to calculate the response times in a network.

Because a router, or other suitable network device, typically sees various traffic traversing, analysis can be performed on data passing through the router. Also, while Flexible NetFlow (see, e.g., RFC3954 at http://www.ietf.org/html.charters/ipfix-charter.html, for standardized Internet Protocol Flow Information eXport or "IPFIX") can be a format including Internet protocol (IP) header, TCP header, etc., any appropriate monitoring mechanism or tool can be utilized in particular embodiments. All relevant portions of RFC3954 are incorporated herein by reference. For example, monitoring mechanisms producing flow records used for billing, capacity planning, other traffic analysis (e.g., load balancing), security detection, or the like, can be utilized in particular embodiments.

In the particular example shown in FIG. 3, Flexible NetFlow may be enabled on interfaces in devices 308-A and 308-B. Further, a clock can be synchronized between devices 308-A and 308-B via network time protocol (NTP) or global positioning system (GPS), for example. As redundant routers in a POP may be located next to each other, NTP might prove sufficient in many cases.

For example, flow records, or other such records from a monitoring mechanism or tool, contain the following fields: source IP address (Src IP), destination IP address (Dest IP), source port (Src Port), destination port (Dest Port), sequence number (Seq. No.), push flag (PSH), acknowledgment (ACK), and start time. In one particular example, an actual flow record coding may be as follows in Table 1.

TABLE 1

Flow record:

flow record my-record
  match ipv4 source address
  match ipv4 destination address
  match transport destination-port
  match transport source-port
  match transport tcp push
  match transport tcp ack
  match tcp sequence-number
  collect timestamp sys-uptime first A Flexible NetFlow feature set can be utilized to implement a flow record as shown above in Table 1. Such a flow record can be programmed within a router, on a blade (e.g., NAM), or using an external probe, for measurements in particular embodiments. Accordingly, a router or other network device can be programmed to collect appropriate data, such that an application server can then collect and correlate this data for response time measurement. Application server 306 can thus see data collected from devices 308-A and 308-B, for example.

Using the topology discussed above with reference to FIG. 3, an example of flow records generated from device 308-A (see, e.g., Table 2 below) and device 308-B (see, e.g., Table 3 below) is shown.

TABLE 2

| Flow Record | Src IP | Dest IP | Src Port | Dest Port | Seq. No. | PSH | ACK | Start Time |
|---|---|---|---|---|---|---|---|---|
| (1) | A | B | C | D | E1 | 0 | NR | T2 |
| (2) | A | B | C | D | E2 | 1 | NR | T5 |

TABLE 3

| Flow Record | Src IP | Dest IP | Src Port | Dest Port | Seq. No. | PSH | ACK | Start Time |
|---|---|---|---|---|---|---|---|---|
| (3) | B | A | D | C | NR | NR | E1 | T8 |

Devices 308-A and 308-B may export a single packet per flow, thus an input filter feature may be used in particular embodiments. Such an input filter may meter flows that have correct source and destination IP addresses. Also, such an input filter may also limit metering of a first flow with a PSH bit=1, for example.

A correlation application may have to first identify the TCP transaction between the client (IP address A/port address C), and the application server (IP address B/port address D) at each end of the connection. Then, using a combination of timestamps and sequence numbers, the correlation application may reconstruct the sequence of events and/or network transaction as illustrated above in FIG. 2 in the following order, as shown below in Table 4.

TABLE 4

| Flow Record | Src IP | Dest IP | Src Port | Dest Port | Seq. No. | PSH | ACK | Start Time |
|---|---|---|---|---|---|---|---|---|
| (1) | A | B | C | D | E1 | 0 | NR | T2 |
| (2) | A | B | C | D | E2 | 1 | NR | T5 |
| (3) | B | A | D | C | NR | NR | E1 | T8 |

For example, the correlation application can compare sequence numbers between the flow records 1 and 2, and examine the PSH flags in order to identify that flow record 2 may be the last packet of the transaction. Thus, the correlation application may then calculate the server delay time as T8-T5. Also, for purposes of calculating the server delay time, a PSH flag for packets from the direction of the application server to the client may not have to be a flow key.

Figure 4:
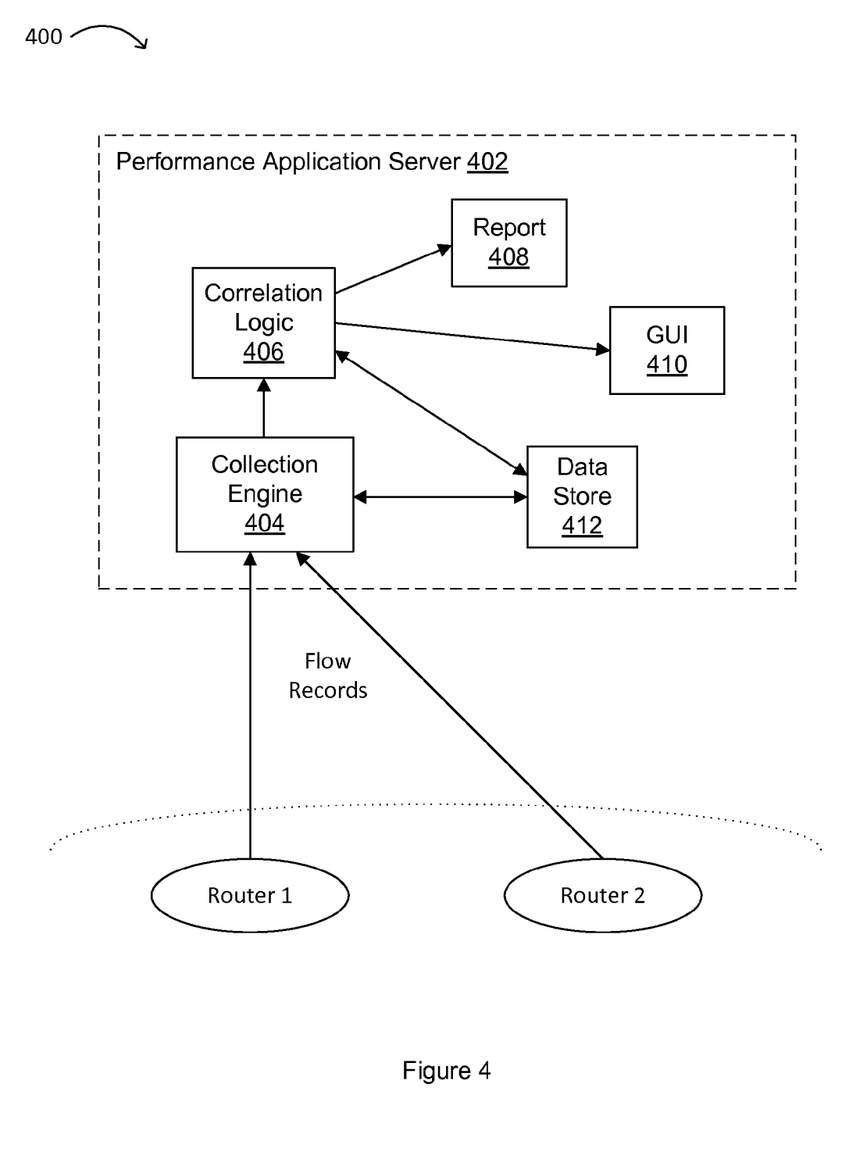
FIG. 4 illustrates an example performance application server and related router structure.

Referring now to FIG. 4, an example performance application server and related router structure is shown and indicated by the general reference character 400. Performance application server 402 may be a different server than application server 306, discussed above with reference to FIG. 3. The correlation application also discussed above can be located in performance application server 402, for example. Performance application server 402 can include collection engine 404, which can take data from network devices (e.g., router 1 and router 2). NetFlow or other flow/monitoring records can include a header, etc., such that collection engine 404 can understand the packet to be data from a particular device, for example.

Also included in a flow record, as discussed above, can be a TCP address of a device such that collection engine 404 can be aware which router or network device has provided the data. Also, a source of the router (e.g., router 1 or router 2), which port has provided that packet, and content of received data, can be included in a flow record. In the particular example of FIG. 4, typical data packets may traverse below the dotted line (i.e., between routers), but flow records can traverse from the routers to collection engine 404 in performance application server 402.

In particular embodiments, Flexible NetFlow or other such monitoring mechanisms can allow for the customization of content, and effective filtering of such content. Some applications may only want to see source information, and it may be desirable to disallow excessive data accumulation. For example, excessive accumulation may lead to overloading, and it may be desirable for performance application server 402 to keep up an operating pace with associated routers.

Thus, a filtering out of information via flow records can accommodate an application server maintaining a rate similar to associated routers to provide a scaling capability. In addition, depending on a particular application, business critical packet flows (e.g., involving financial institutions) may be measured and prioritized over e-mail or other typical web surfing applications. Thus, some applications may require tighter measurement control, and this can be accommodated via flow record control.

Once collected information is received in collection engine 404, the data can be stored in data store 412. Correlation logic 406 can be applied to the collected data (e.g., via collection engine 404 and/or data store 412), and a report 408 and/or graphical user interface (GUI) 410 can be produced. Essentially, data can be collected in an engine, processed, and a report showing response times can be produced or supported. Thus, each request and response can be correlated using correlation logic and/or a correlation application. Such network transaction reconstruction may also occur along with a collection process in order to clarify multiple data sources, as well as the send/receive directions of those data packets.

Figure 5:
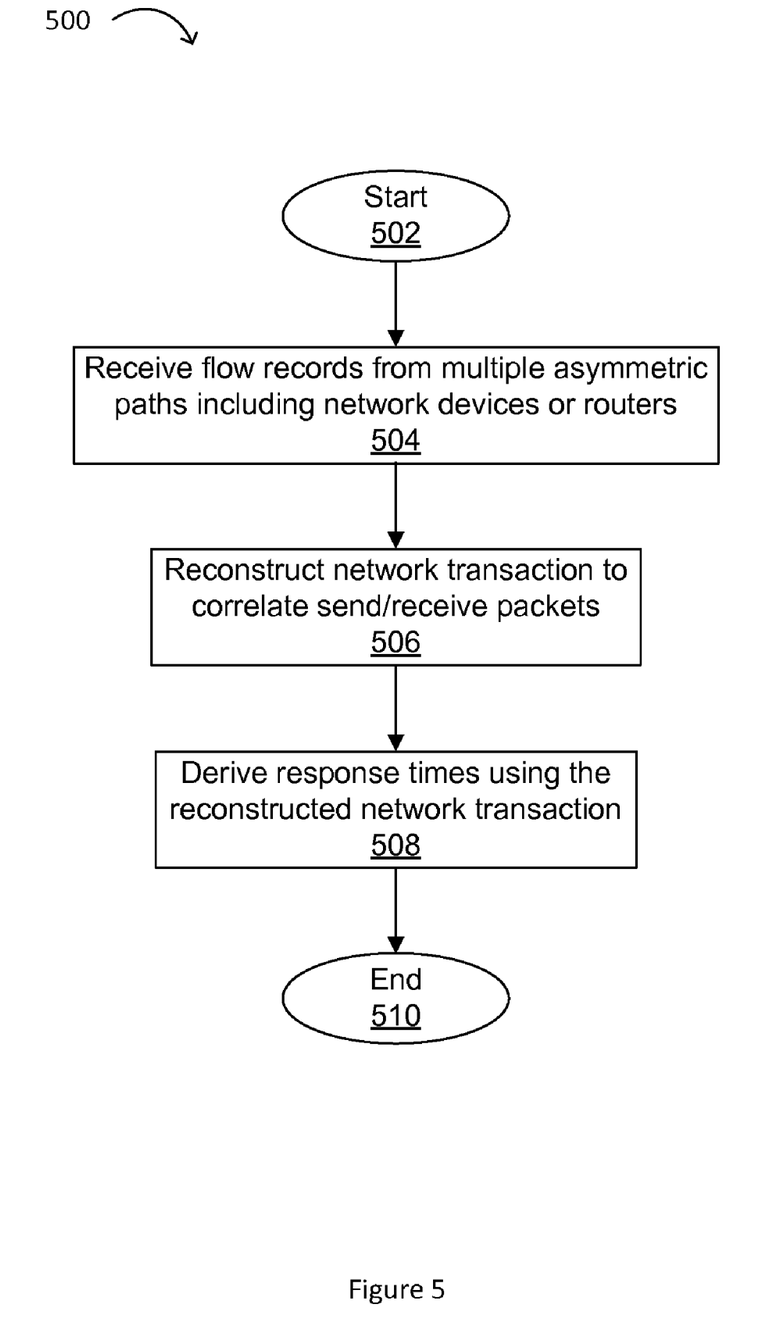
FIG. 5 illustrates an example flow diagram for measuring response times.

Referring now to FIG. 5, an example flow method diagram for measuring response times is shown and indicated by the general reference character 500. The method can begin (502), and the flow records can be received from multiple asymmetric paths that can include network devices and/or routers (504). For example, the received flow records may be unidirectional. The network transaction can then be reconstructed using the received flow records (506). For example, the network transaction reconstruction can occur in correlation logic and/or a correlation application, as discussed above, and reconstructed flow records utilized therein may be bidirectional. Next, response times can be derived using the reconstructed network transaction (508), and the flow can complete (510). The reconstruction may be from end to end, including the request and the response for each packet and/or information flow. In addition, GUI support and/or reports can be produced, as determined by a particular application requesting response time measurements.

Accordingly, in particular embodiments, a mechanism for conveying a relevant source of response time information from multiple devices, and a technique to correlate the information in order to calculate response times in asymmetric routing environments, can be accommodated. Such a mechanism can use a Flexible NetFlow technology as a source of the response time measurement data, for example. The technique can also define a correlation logic using NetFlow information to calculate the various response times in a network.

Although the description has been described with respect to particular embodiments thereof, these particular embodiments are merely illustrative, and not restrictive. For example, while switches/routers and particular network arrangements have been described, other types of network devices, as well as network arrangements, are suitable for particular embodiments. In addition, while particular approaches for flow records (e.g., Flexible NetFlow) have been described, other types of monitoring records, tools, and/or mechanisms can also be utilized in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as standalone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
receiving, in an application server, generated flow records from a plurality of distinct and synchronized network devices that include a first network device and a second network device on asymmetric paths between a client and a transaction server, the synchronized network devices operating in an a distributed manner such that first communications related to a first portion of a first transaction pass through at least the first network device but not through the second network device, and second communications related to a second portion of the first transaction pass through at least the second network device, wherein the received flow record comprises information associated with a source information, a destination information, a sequence number, a push flag, a start time, and a content type;
filtering, in the application server, flow record information based on one of the source information, the destination information, the sequence number, the push flag, the start time, and the content type;
reconstructing, in the application server, a network transaction from the filtered flow records;
comparing the sequence numbers from at least two of the filtered flow records;
determining a last packet in the network transaction based on examination of the push flag from each of the at least two filtered flow records;
generating, with the reconstructed network transaction, response times based on results of the comparison of the sequence numbers and based on the determined last packet; and
reporting the generated response times.

2. The method of claim 1, wherein the received flow records comprise unidirectional flow records.

3. The method of claim 2, wherein the reconstructed network transaction comprises bidirectional flow records.

4. The method of claim 1, wherein reporting of the generated response times comprises using a graphical user interface (GUI).

5. The method of claim 1, wherein receiving the generated flow records comprise using a collection engine of the application server.

6. The method of claim 1, wherein reconstructing the network transaction comprises using correlation logic in the application server.

7. The method of claim 1, wherein filtering of the flow records comprises using a flow record control in the application server.

8. A system, comprising:
an application server having a processor;
a collection engine in the application server, the collection engine being configured to receive generated flow records from a plurality of synchronized network devices, wherein the plurality of synchronized network devices are configured to communicate data packets, and wherein the received generated flow record comprises information associated with a source information, a destination information, a sequence number, a push flag, a start time, and a content type;

a flow record control in the application server, the flow record control being configured to filter the received generated flow record information based on one of the source information, the destination information, the sequence number, the push flag, the start time, and the content type;

logic encoded in a tangible media for execution by the processor, and when executed operable to correlate at least two filtered flow records received from at least two different synchronized network devices on asymmetric links between a client and a transaction server for generation of a reconstructed network transaction, the synchronized network devices operating in an a distributed manner such that first communications related to a first portion of a first transaction pass through at least the first network device and second communications related to a second portion of the first transaction pass through at least the second network device and the first communications for the first transaction do not pass through the second network device; and logic encoded in a tangible media for execution by the processor, and when executed operable to generate and report a response time measurement for at least a portion of the data packets based on the reconstructed network transaction.

9. The system of claim 8, wherein the received flow records comprise unidirectional flow records.

10. The system of claim 8, further comprising a data store coupled to the collection engine.

11. The system of claim 8, wherein at least one of the plurality of synchronized network devices comprises a blade configured as a network analysis module (NAM).

12. An apparatus, comprising:
one or more processors; and
software encoded in one or more computer-readable storage media for execution by the one or more processors, and when executed operable to:
  receive generated flow records from a plurality of distinct and synchronized network devices that include a first network device and a second network device on asymmetric paths between a client and a transaction server, the synchronized network devices operating in an a distributed manner such that first communications related to a first portion of a first transaction pass through at least the first network device but not through the second network device, and second communications related to a second portion of the first transaction pass through at least the second network device, wherein the received flow record comprises information associated with a source information, a destination information, a sequence number, a push flag, a start time, and a content type;
  filter flow record information based on one of the source information, the destination information, the sequence number, the push flag, the start time, and the content type;
  reconstruct a network transaction from the filtered flow records;
  determine a last packet in the network transaction based on examination of the push flag from each of the at least two filtered flow records;
  generate, using the reconstructed network transaction, response times based on results of the comparison of the sequence numbers and based on the determined last packet; and
  report the generated response times.

13. The apparatus of claim 12, wherein the received flow records comprise unidirectional flow records.

14. The apparatus of claim 13, wherein the reconstructed network transaction comprises bidirectional flow records.

15. The apparatus of claim 12, wherein the report of the generated response times is performed via a graphical user interface (GUI).

16. The apparatus of claim 12, wherein the flow records are received using a collection engine of the application server.

17. The apparatus of claim 12, wherein the network transaction is reconstructed using correlation logic in the application server.

18. The apparatus of claim 12, wherein the flow records are received from a blade in at least one of the plurality of synchronized network devices.

19. The apparatus of claim 12, wherein the flow records are filtered using a flow record control in the application server.

20. A non-transitory computer readable medium including one or more instructions executable by one or more processors, the non-transitory computer readable medium comprising one or more instructions for:
  receiving, in an application server, generated flow records from a plurality of distinct and synchronized network devices that include a first network device and a second network device on asymmetric paths between a client and a transaction server, the synchronized network devices operating in an a distributed manner such that first communications related to a first portion of a first transaction pass through at least the first network device but not through the second network device, and second communications related to a second portion of the first transaction pass through at least the second network device, wherein the received flow record comprises information associated with a source information, a destination information, a sequence number, a push flag, a start time, and a content type;
  filtering, in the application server, flow record information based on one of the source information, the destination information, the sequence number, the push flag, the start time, and the content type;
  reconstructing, in the application server, a network transaction from the filtered flow records;
  comparing the sequence numbers from at least two of the filtered flow records;
  determining a last packet in the network transaction based on examination of the push flag from each of the at least two filtered flow records;
  generating, with the reconstructed network transaction, response times based on results of the comparison of the sequence numbers and based on the determined last packet; and
  reporting the generated response times.

* * * * *